United States Patent
Eo et al.

(10) Patent No.: US 9,163,711 B2
(45) Date of Patent: Oct. 20, 2015

(54) AUTOMATED MANUAL TRANSMISSION FOR VEHICLE

(71) Applicant: Hyundai Motor Company, Seoul (KR)

(72) Inventors: Soon Ki Eo, Ansan-si (KR); Dong Soo Lee, Seoul (KR); Jong Yun Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 226 days.

(21) Appl. No.: 13/664,092

(22) Filed: Oct. 30, 2012

(65) Prior Publication Data

US 2013/0237371 A1    Sep. 12, 2013

(30) Foreign Application Priority Data

Mar. 12, 2012    (KR) ........................ 10-2012-0025084

(51) Int. Cl.
     *F16H 37/02*      (2006.01)
     *F16H 61/04*      (2006.01)
     *F16H 15/20*      (2006.01)

(52) U.S. Cl.
CPC .............. *F16H 37/021* (2013.01); *F16H 61/04* (2013.01); *F16H 15/20* (2013.01); *F16H 2061/0425* (2013.01); *Y10T 74/19251* (2015.01)

(58) Field of Classification Search
CPC .................................................... F16H 37/021
USPC ................... 74/325, 329, 333; 476/22, 51, 59
See application file for complete search history.

(56) References Cited

U.S. PATENT DOCUMENTS

| | | | |
|---|---|---|---|
| 1,844,239 A * | 2/1932 | Boehme et al. | ................. 476/48 |
| 2,611,038 A * | 9/1952 | Graham | ..................... 369/47.37 |
| 2,835,134 A | 5/1958 | Perruca | |
| 3,010,330 A | 11/1961 | Perruca | |
| 4,099,683 A | 7/1978 | Stouffer et al. | |
| 4,226,135 A | 10/1980 | Winter | |
| 5,311,789 A | 5/1994 | Henzler et al. | |
| 5,613,401 A | 3/1997 | Maurizio | |
| 7,258,032 B2 | 8/2007 | Kim | |
| 7,513,851 B2 | 4/2009 | Sieffert et al. | |
| 8,042,418 B2 | 10/2011 | Matsushita et al. | |
| 8,220,352 B2 | 7/2012 | Ross et al. | |

(Continued)

FOREIGN PATENT DOCUMENTS

| | | |
|---|---|---|
| DE | 42 34 629 A1 | 4/1993 |
| EP | 0 071 801 A1 | 7/1982 |
| JP | 63-163062 * | 7/1988 |
| JP | 2003-106389 A | 4/2003 |
| JP | 2005-195115 A | 7/2005 |

(Continued)

OTHER PUBLICATIONS

Automated Manual Transmission, pp. 87-94.

*Primary Examiner* — William C Joyce
(74) *Attorney, Agent, or Firm* — Morgan, Lewis & Bockius LLP

(57) ABSTRACT

An automated manual transmission apparatus for a vehicle, may include a shifting unit having a plurality of stages between an input shaft and an output shaft and selectively cutting power to the input shaft and the output shaft when shifting between the stages, and a continuous transmission mechanism that may be disposed between the output shaft and a power supply that supplies the power to the input shaft of the shifting unit, wherein the continuous transmission mechanism selectively transmits the power from the power supply to the output shaft with a continuous transmission gear ratio.

8 Claims, 6 Drawing Sheets

(56) References Cited

U.S. PATENT DOCUMENTS

| | | |
|---|---|---|
| 8,360,919 B2 | 1/2013 | Kraynev et al. |
| 8,696,505 B2 | 4/2014 | Lee et al. |
| 2002/0033059 A1 | 3/2002 | Pels et al. |
| 2011/0017015 A1 | 1/2011 | Cimatti et al. |
| 2011/0203409 A1 | 8/2011 | Nishida et al. |

FOREIGN PATENT DOCUMENTS

| | | |
|---|---|---|
| KR | 2003-0031896 A | 4/2003 |
| KR | 10-0951967 B1 | 12/2009 |
| KR | 10-2010-0042964 A | 4/2010 |
| KR | 10-2011-0001326 A | 1/2011 |
| KR | 10-2011-0021120 A | 3/2011 |

* cited by examiner

AUTOMATED MANUAL TRANSMISSION FOR VEHICLE

CROSS-REFERENCE TO RELATED APPLICATION

The present application claims priority to Korean Patent Application No. 10-2012-0025084 filed on Mar. 12, 2012, the entire contents of which is incorporated herein for all purposes by this reference.

BACKGROUND OF THE INVENTION

1. Field of the Invention

The present disclosure relates to an automated manual transmission. More particularly, it relates to the configuration of an automated manual transmission which makes it possible to prevent non-smooth shifting, such as pulling, when shifting.

2. Description of Related Art

Automated manual transmissions are automatically shifted by an actuator while a vehicle travels, such that they can provide convenience similar to automatic transmissions and contribute to improving fuel efficiency of a vehicle with power transmission efficiency better than automatic transmissions.

However, for an automated manual transmission based on a synchro-mesh type of shifting mechanism, power is necessarily instantaneously cut even during shifting that is automatically performed by an actuator, such that torque decreases and non-smooth shifting, as if a vehicle is pulled back, is generated.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automated manual transmission for a vehicle that can improve the commercial value of a vehicle by preventing non-smooth shifting to achieve smooth and stable shifting response, by allowing specific power to be transmitted to the driving wheels in shifting while using the mechanism of a manual transmission, which necessarily connects power after instantaneously cutting the power for shifting in the related art, to prevent reduction of torque generated in shifting.

In an aspect of the present invention, an automated manual transmission apparatus for a vehicle, may include a shifting unit having a plurality of stages between an input shaft and an output shaft and selectively cutting power to the input shaft and the output shaft when shifting between the stages, and a continuous transmission mechanism that is disposed between the output shaft and a power supply that supplies the power to the input shaft of the shifting unit, wherein the continuous transmission mechanism selectively transmits the power from the power supply to the output shaft with a continuous transmission gear ratio.

The continuous transmission mechanism may include a driving conical body that forms a conical surface and is connected to the power supply, a driven conical body that forms a conical surface opposite the conical surface of the driving conical body at a predetermined distance therebetween, and a movable roller disposed between the two conical surfaces of the driving conical body and the driven conical body and movable between the two conical surfaces so as to change a position thereof between the two conical surfaces and to transmit a rotational force of the driving conical body to the driven conical body with the continuous transmission gear ratio.

A rotation axis of the driven conical body is in parallel with a rotation axis of the driving conical body.

A power control mechanism is disposed between the driven conical body and the output shaft to connect or cut the power therebetween.

The automated manual transmission apparatus may further include a driving gear, and a driven gear engaged with the driving gear and connected to the output shaft, wherein the power control mechanism selectively couples the driven conical body to the driving gear to connect or cut the power between the driven conical body and the driving gear.

A clutch that selectively transmits the power from the power supply to the input shaft is disposed between the input shaft and the power supply.

The clutch may have a clutch disc disposed inside the driving conical body to control the power from the power supply.

The automated manual transmission apparatus may further include a control motor, and a feed rod, wherein an end of the feed rod is connected to the control motor and the movable roller is rotatably connected to the other end of the feed rod, wherein the control motor controls a longitudinal straight motion of the feed rod to move the movable roller between the two opposite conical surfaces of the driving conical body and the driven conical body.

The shifting mechanism of the shifting unit is implemented by a synchro-mesh type in which the shifting mechanism is engaged after synchronization by using a key and a synchronizer ring.

The shifting mechanism of the shifting unit is implemented by a dog clutch.

A rear idle gear is disposed between the input shaft and the output shaft.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
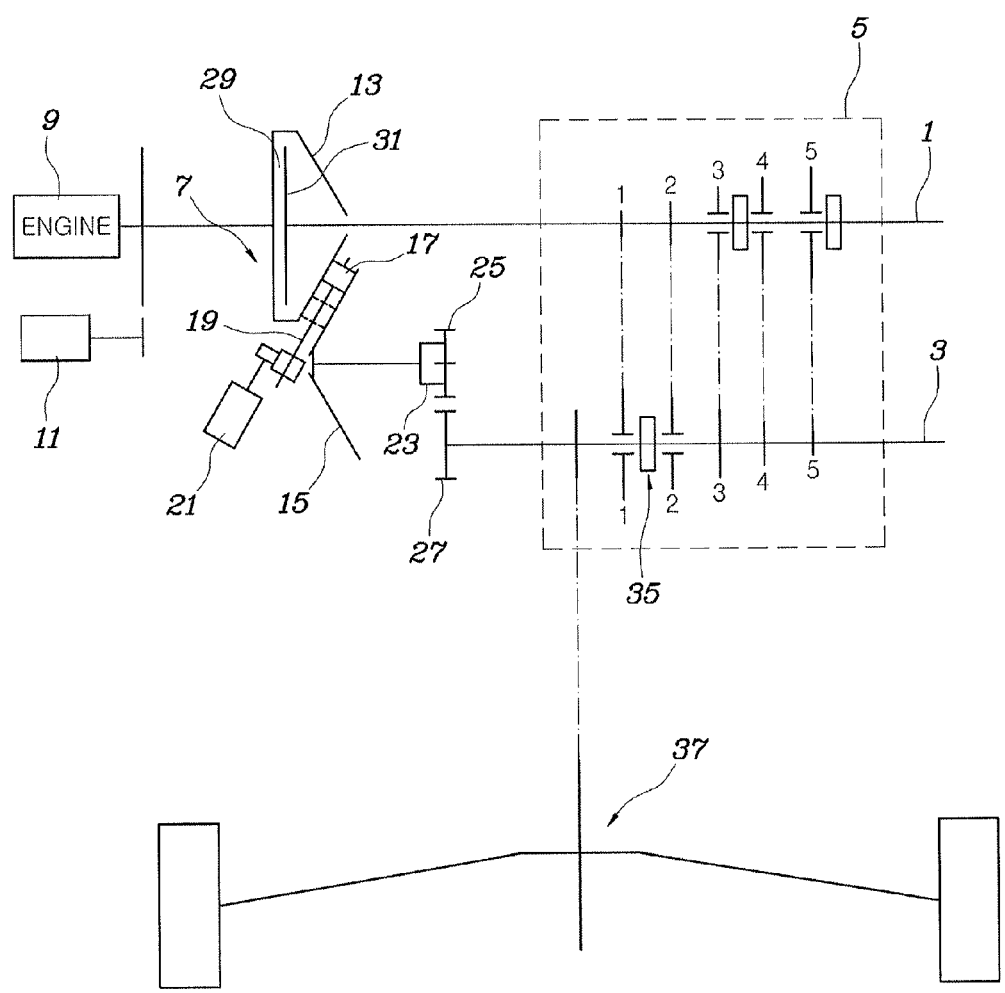
FIG. 1 is a view showing the configuration of an automated manual transmission for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Referring to FIG. 1, an automated manual transmission for a vehicle according to an exemplary embodiment of the present invention includes: a shifting unit 5 having a plurality of stages between an input shaft 1 and an output shaft 3 and implemented by a mechanism that necessarily cuts power when shifting between the stages, and a continuous transmission mechanism 7 that is disposed between the output shaft 3 and a power supply that supplies power to the input shaft 1 of the shifting unit 5 and transmits power from the power supply to the output shaft 3 with a continuous transmission gear ratio.

That is, the shifting unit 5 having the shifting mechanism of common manual transmission of the related art is implemented to be able to prevent reduction of torque due to cutting of power in shifting by allowing the continuous transmission mechanism 7 to receive power in parallel from the power supply and to continuously supply the power to the output shaft 3, not through the input shaft 1, when the shifting unit 5 is operated.

The power supply may be an engine 9 that is an internal combustion engine, as in the exemplary embodiment, and a start motor 11 for starting an engine is connected to the engine 9.

In the exemplary embodiment, the continuous transmission mechanism 7 includes: a driving conical body 13 that is connected to a rotary shaft of the power supply, a driven conical body 15 that forms a conical surface opposite the conical surface of the driving conical body 13 at a predetermined distance and has a rotary shaft parallel with the rotary shaft of the driving conical body 13, and a movable roller 17 that changes the position between the two opposite conical surfaces of the driving conical body 13 and the driven conical body 15 and transmits a rotational force of the driving conical body 13 to the driven conical body 15 with a continuous transmission gear ratio.

That is, as the movable roller 17 moves between the tow opposite conical surfaces, the power from the driving conical body 13 is continuously transmitted to the driven conical body 15.

A feed rod 19 that supports the movable roller 17 such that the movable roller 17 is be able to relatively rotate about the feed rod 19, and moves the movable roller 17 between the two opposite conical surfaces of the driving conical body 13 and the driven conical body 15 by longitudinally moving straight is connected to the movable roller 17 and a control motor 21 is connected to the feed rod 19 to control the longitudinal straight motion so that as the movable roller 17 is controlled by the control motor 21 to be moved by the feed rod 19, the transmission gear ratio between the driving conical body 13 and the driven conical body 15 is continuously changed.

Obviously, an actuator may be used as the device for moving the movable roller 17, but the configuration composed of the feed rod 19 and the control motor 21 may be considered as being preferable to the movable roller 17 with appropriate accuracy and a relatively low cost.

Further, the continuous transmission mechanism 7 may be replaced by the mechanisms of various continuously variable transmissions of the related art, and for example, a continuously variable transmission using pulleys and a belt or a toroidal continuously variable transmission of the related art may be used.

Meanwhile, a power control mechanism 23 is disposed between the driven conical body 15 and the output shaft 3 to connect or cut the power.

In the exemplary embodiment, a driving gear 25 transmitting power to the output shaft 3 is fitted on the rotary shaft of the driven conical body 15, a driven gear 27 engaged with the driving gear 25 is fitted on the output shaft 3, and the power control mechanism 23 can connect or cut the power between the driven conical body 15 and the driving gear 25, on the rotary shaft of the driven conical body 15.

Obviously, unlike the above, another configuration may be possible, such as that the power control mechanism 23 is disposed at the output shaft 3 and the power control mechanism 23 may be appropriately selected from a friction clutch, a dog clutch, a synchro-mesh device, a friction band, a magnetic clutch, and the like.

A clutch 29 that selectively transmits the power from the power supply to the input shaft 1 is disposed between the input shaft 1 and the power supply.

In the exemplary embodiment, the clutch 29 may have a compact configuration with a clutch disc 31 disposed inside the driving conical body 13 to control the power from the power supply in order to occupy as small space as possible.

The shifting mechanism of the shifting unit 5 is implemented by a synchro-mesh type in which it is engaged after synchronization by using a key and a synchronizer ring, or by a dog clutch, but it is more preferable to use a synchro-mesh type shifting mechanism that can minimize a power-cutting time and is most generally used at the present time, or other shifting mechanisms may be used, and the shifting mechanisms are the same in that it is necessary to cut the power inputted to the input shaft when shifting and torque is correspondingly decreased in shifting.

In the exemplary embodiment shown in FIGS. 1 to 6, the shifting unit 5 is provided as a synchro-mesh type shifting mechanism and has first stage to fifth stage and an R-range.

Figure 4:
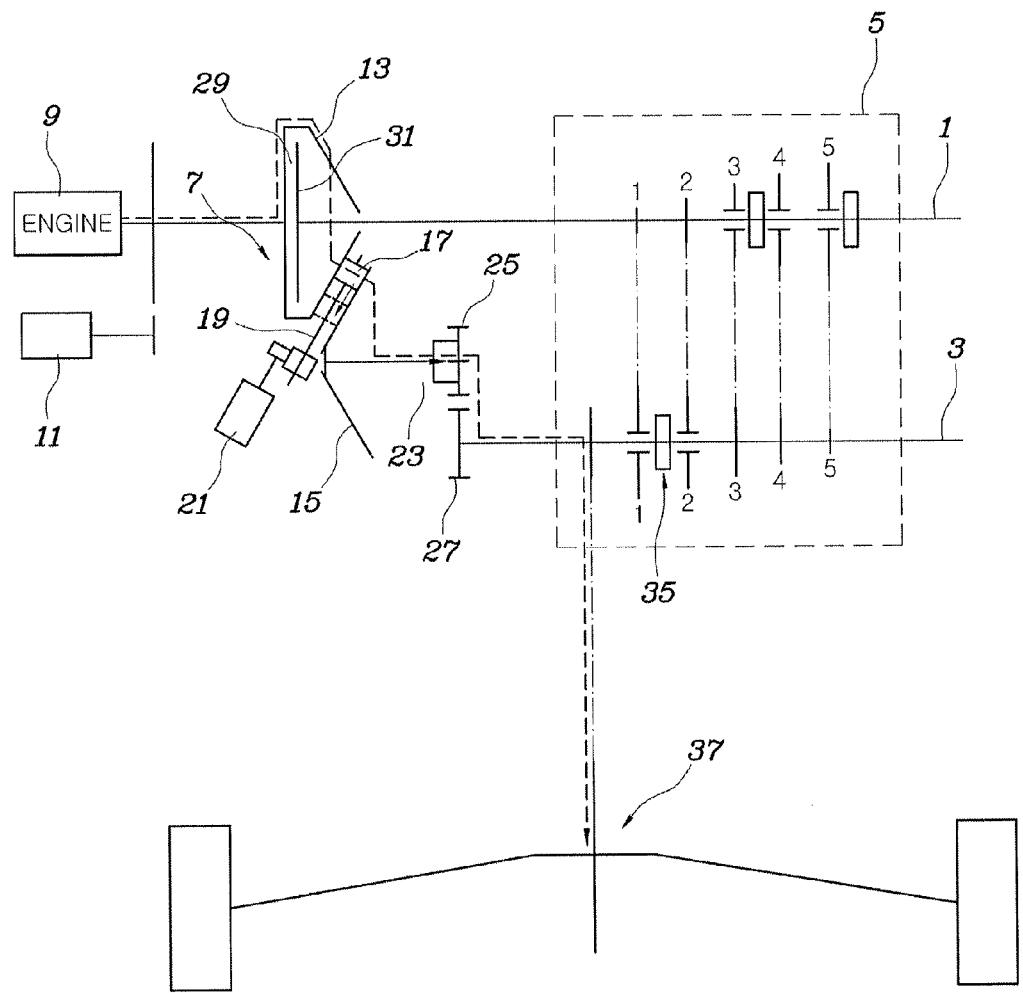
FIG. 4 is a view illustrating power transmission when the transmission is shifted from the first stage to the second stage started in FIG. 1.
Figure 5:
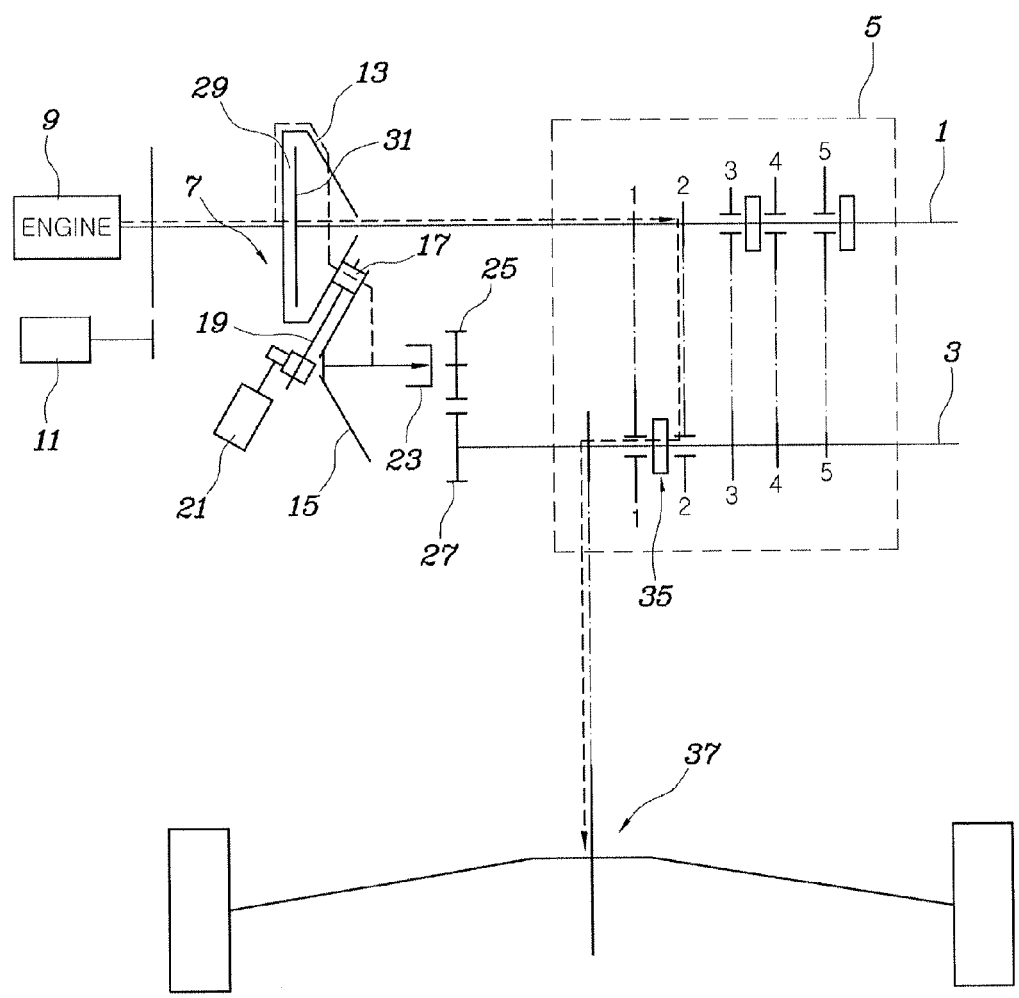
FIG. 5 is a view illustrating power transmission when a vehicle travels in the second stage in FIG. 1.
Figure 6:
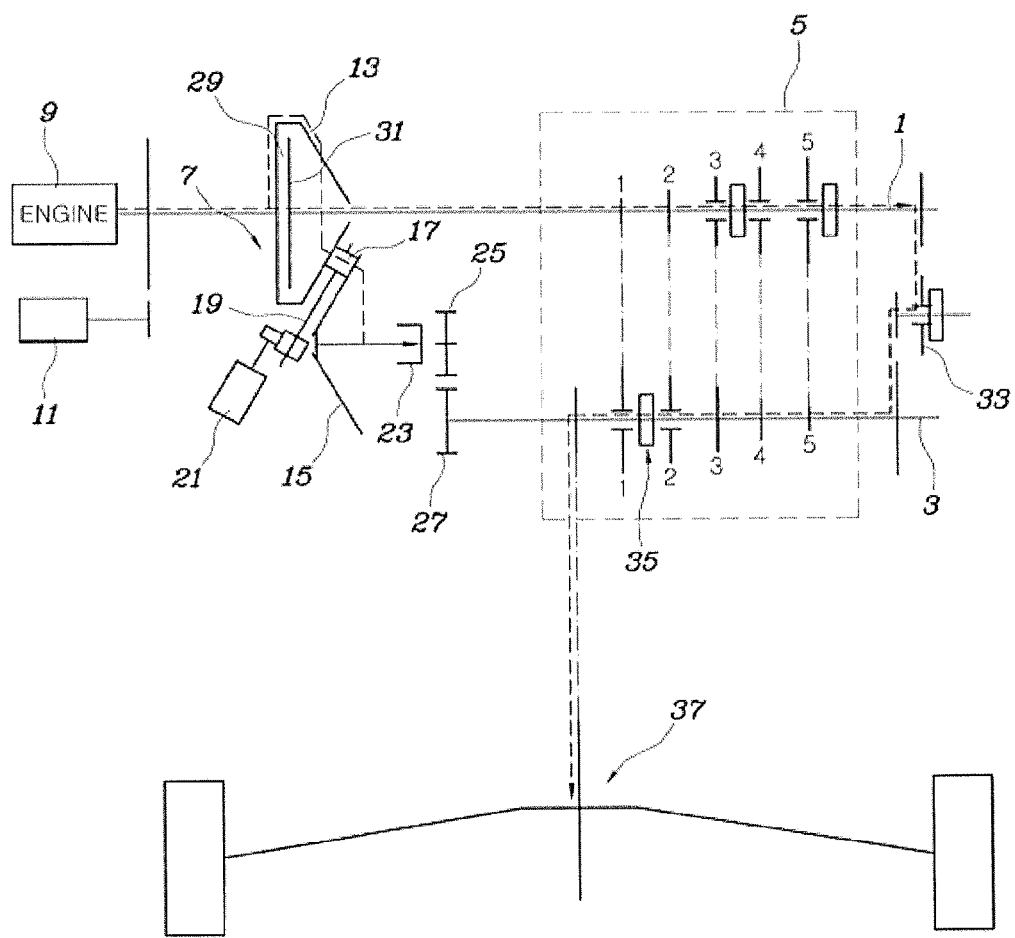
FIG. 6 is a view illustrating power transmission when a vehicle travels with an R-range in FIG. 1.

The operation of the present invention having the above configuration is described hereafter with reference to FIGS. 2 to 6. For reference, FIG. 6 illustrate when a vehicle travels in an R-range for reverse and further shows a rear idler gear 33, which is not shown in FIGS. 1 to 5.

Figure 2:
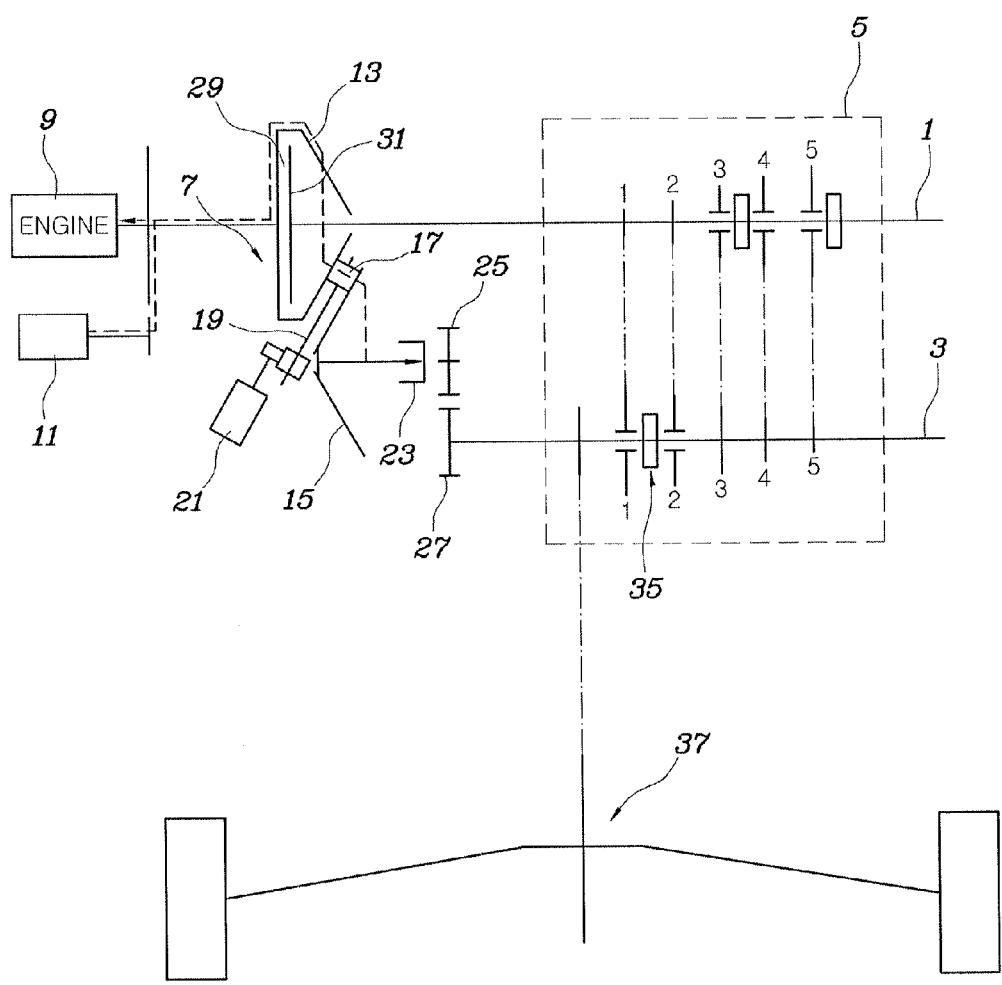
FIG. 2 is a view illustrating power transmission when the engine is started in FIG. 1.

FIG. 2 shows when the engine 9 is started, in which both the clutch 29 and the power control mechanism 23 are disconnected and the engine 9 is cranked by the start motor 23 to be started. Therefore, the rotational force for the engine 9 is transmitted only to the driven conical body 15 through the driving conical body 13 and the movable roller 17, without transmitting power to the input shaft 1 or the output shaft 3.

Obviously, when any gear in the shifting unit 5 is not engaged and the engine is started, it is possible to start the engine even with the clutch 29 engaged.

Figure 3:
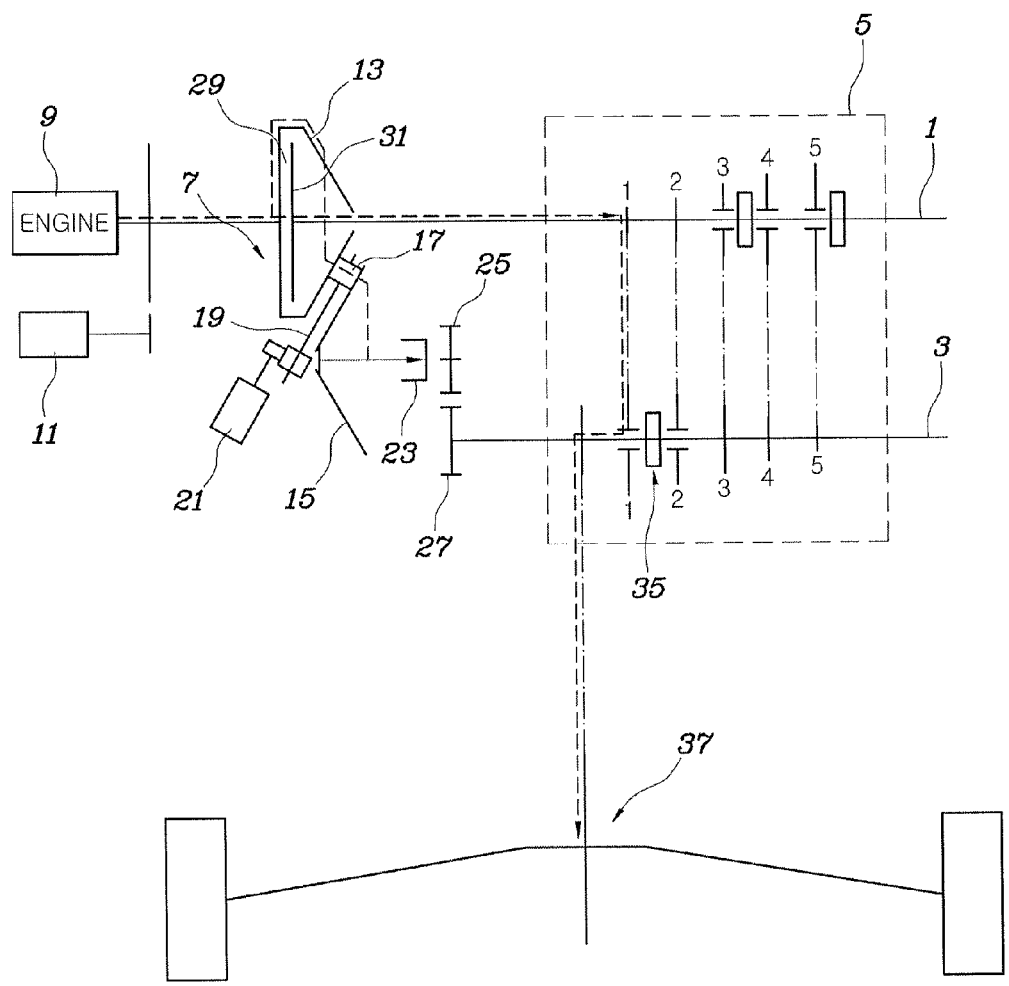
FIG. 3 is a view illustrating power transmission when a vehicle travels with the first stage in FIG. 1.

In the state described above, when the clutch 29 is disengaged, the first stage can be engaged by a first-second stage synchro-engaging device 35, such that it is possible to implement the first stage-traveling state, as how in FIG. 3, while driving the vehicle, by engaging the clutch 29.

In FIG. 3, the power from the engine 9 is transmitted to the output shaft 3 through a pair of first stage gears while the transmission is shifted to the first stage after being transmitted to the input shaft 1 through the clutch 29, and then is transmitted to the driving wheels through a differential gear 37.

In this process, the power control mechanism 23 keeps disengaged, such that the power is not transmitted to the output shaft 3 through the driving conical body 13 and the driven conical body 15.

FIG. 4 shows an intermediate process that the transmission is shifted from the first stage to the second stage, in which the power from the engine 9 is transmitted to the output shaft 3 through the driving conical body 13, the movable roller 17, and the driven conical body 15 even while not transmitted to the input shaft in order to prevent reduction of torque by disengaging the clutch 29 and engaging the power control mechanism 23.

In this process, the position of the movable roller 17 changes from the position where the driven conical body 15 can fit the rotational speed of the output shaft 3 in the first stage to the position where it can fit the rotational speed of the output shaft 3 in the second stage, in which the control is performed by operating the control motor 21 so that it is possible to prevent reduction of torque due to cutting of torque to the input shaft 1 by the clutch 29 and achieve smooth shifting from the current stage to the desire stage while the transmission is shifted from the first stage to the second stage.

While the clutch 29 is disengaged, the power control mechanism 23 is engaged, and the power from the engine 9 is supplied to the output shaft 3 through the driving conical body 13 and the driven conical body 15, the first-second stage synchro-engaging device 35 disengages the first stage and engages the second stage.

As described above, as the clutch 29 is engaged and the power control mechanism 23 is disengaged after the second stage is engaged, the second stage-traveling state shown in FIG. 5 is implemented.

In FIG. 5, the power from the engine 9 is adjusted for the second stage between the input shaft 1 and the output shaft 3 through the clutch 29 and supplied to the driving wheels through the differential gear 37 and the power transmitted to the driven conical body 15 from the engine 9 has been cut by the power control mechanism 23.

As described above, power that is continuously supplied to the output shaft 3 by the driving conical body 13, the movable roller 17, and the driven conical body 15 while the transmission is shifted from the first stage to the second stage is supplied in the same way when transmission is shifted between the other stages and it is possible to fit the rotational speed of the output shaft 3 at the current stage and a desired stage and compensate power between the driving conical body 13 and the driven conical body 15 even when shifting between the high stages such as the fourth stage and the fifth stage and shifting to an overdrive stage, particularly in addition to shifting between low stages such as the first stage and the second stage, such that it is possible to prevent reduction of torque in shifting throughout the overall shifting range of the transmission and achieve smooth and stable shifting.

Meanwhile, FIG. 6 shows power transmission when a vehicle moves back, in which the stage for reverse is implemented by engaging the reverse idler gear 39 between the input shaft 1 and the output shaft 3, with the vehicle stopped.

According to an exemplary embodiment of the present invention, it is possible to improve the commercial value of a vehicle by preventing non-smooth shifting to achieve smooth and stable shifting response, by allowing specific power to be transmitted to the driving wheels in shifting while using the mechanism of a manual transmission, which necessarily connects power after instantaneously cutting the power for shifting in the related art, to prevent reduction of torque generated in shifting.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission apparatus for a vehicle, comprising:
   a shifting unit having a plurality of stages between an input shaft and an output shaft and selectively cutting power to the input shaft and the output shaft when shifting between the stages; and
   a continuous transmission mechanism that is disposed between the output shaft and a power supply that supplies the power to the input shaft of the shifting unit, wherein the continuous transmission mechanism selectively transmits the power from the power supply to the output shaft with a continuous transmission gear ratio,
   wherein the continuous transmission mechanism includes:
      a driving conical body that forms a conical surface and is connected to the power supply;
      a driven conical body that forms a conical surface opposite the conical surface of the driving conical body at a predetermined distance therebetween; and
      a movable roller disposed between the two conical surfaces of the driving conical body and the driven conical body and movable between the two conical surfaces so as to change a position thereof between the two conical surfaces and to transmit a rotational force of the driving conical body to the driven conical body with the continuous transmission gear ratio, wherein a clutch that selectively transmits the power from the power supply to the input shaft is disposed between the input shaft and the power supply, and wherein the clutch has a clutch disc disposed inside the driving conical body to control the power from the power supply.

2. The automated manual transmission apparatus of claim 1, wherein a rotation axis of the driven conical body is in parallel with a rotation axis of the driving conical body.

3. The automated manual transmission apparatus of claim 1, wherein a power control mechanism is disposed between the driven conical body and the output shaft to connect or cut the power therebetween.

4. The automated manual transmission apparatus of claim 3, further including:
 a driving gear; and
 a driven gear engaged with the driving gear and connected to the output shaft, wherein the power control mechanism selectively couples the driven conical body to the driving gear to connect or cut the power between the driven conical body and the driving gear.

5. The automated manual transmission apparatus of claim 1, further including:
 a control motor; and
 a feed rod, wherein an end of the feed rod is connected to the control motor and the movable roller is rotatably connected to the other end of the feed rod, wherein the control motor controls a longitudinal straight motion of the feed rod to move the movable roller between the two opposite conical surfaces of the driving conical body and the driven conical body.

6. The automated manual transmission apparatus of claim 1, wherein a shifting mechanism of the shifting unit is implemented by a synchro-mesh mechanism in which the shifting mechanism is engaged after synchronization by using a key and a synchronizer ring.

7. The automated manual transmission apparatus of claim 1, wherein a shifting mechanism of the shifting unit is implemented by a dog clutch.

8. The automated manual transmission apparatus of claim 1, wherein a rear idle gear is disposed between the input shaft and the output shaft.

* * * * *